United States Patent Office 3,657,384
Patented Apr. 18, 1972

3,657,384
THERMOSETTING COATING COMPOSITIONS
Toyohiko Yoshida and Shinichi Wako, Yokohama, Masamitsu Koshimura, Fujisawa, Junichi Matsuzaka, Yokohama, and Yukinori Haruta, Tokyo, Japan, assignors to Nippon Oils and Fats Company Limited, Tokyo, Japan
No Drawing. Filed July 28, 1969, Ser. No. 845,506
Claims priority, application Japan, July 31, 1968, 43/54,208; Aug. 13, 1968, 43/57,568
Int. Cl. C08g 37/32
U.S. Cl. 260—856                3 Claims

ABSTRACT OF THE DISCLOSURE

Thermosetting coating compositions comprising a thermoplastic copolymer (component A) consisting of 15 to 99% by weight of a monomer (I) having the general formula

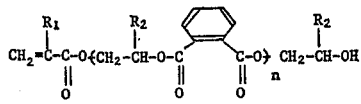

wherein $R_1$ is hydrogen, methyl or ethyl, $R_2$ is hydrogen, methyl or the combination of hydrogen and methyl and $n$ is 1 to 3, 1 to 20% by weight of an $\alpha,\beta$-monoethylenically unsaturated carboxylic acid (monomer (II)) of acrylic acid, methacrylic acid, itaconic acid or crotonic acid and 0 to 89% by weight of an $\alpha,\beta$-monoethylenically unsaturated compound (monomer (III)), copolymerizable with the monomers (I) and (II) and an alkylated aminoplast (component (B) which is a condensate of a compound having one or more triazine rings in one molecule, formaldehyde and a saturated monohydric alcohol having 1 to 6 carbon atoms, a mixture ratio of the component (A) to the component (B) being from 60/40 to 90/10.

---

The present invention relates to novel thermosetting coating compositions and more particularly liquid thermosetting coating compositions dissolved or dispersed in an organic solvent, water or a homogeneous mixture of water and the organic solvent.

An object of the present invention is to provide sprayable coating compositions dissolved in an organic solvent which cures at a relatively low temperature and provides a coating film having a smooth surface due to the excellent leveling property and a clear color, high gloss and hardness and improved yellowing resistance, mar resistance, chemical resistance and outdoor durability.

Another object of the present invention is to provide water reducible coating compositions which cover faults such as cracks on substrates to provide a smooth coating surface and have an excellent storage stability.

The thermosetting coating compositions of the present invention comprise a component (A) of a thremoplastic copolymer (referred to merely as copolymer hereinafter) and a component (B) of alkylated aminoplasts.

The component (A) is a copolymer consisting of a novel monomer (I) having the following general formula

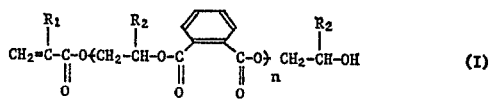

wherein $R_1$ is hydrogen, methyl or ethyl, $R_2$ is hydrogen, methyl or a combination of hydrogen and methyl group and $n$ is an integer of 1 to 3, and an $\alpha,\beta$-monoethylenically unsaturated carboxylic acid (monomer II) having the general formula

wherein $R_3$ is hydrogen or methyl, $R_4$ is hydrogen, methyl or $CH_2$ COOH, provided that both $R_3$ and $R_4$ are not methyl group, or a copolymer consisting of the above monomers (I) and (II) and at least one $\alpha,\beta$-monoethylenically unsaturated compound copolymerizable with these monomers.

The novel monomer (I) has been disclosed in a copending patent application entitled "Novel Vinylic Polymerizable Monomers and a Method of Producing Said Monomers" by Koshimura et al., Ser. No. 822,299 filed May 6, 1969 and is produced by a ring breakage reaction of phthalic acid anhydride with ethylene oxide, propylene oxide or a mixture of ethylene oxide and propylene oxide in the presence of a lithium salt by using acrylic acid, methacrylic acid or $\alpha$-ethylacrylic acid as an initiator. In a specific producedure, monomer I is produced by reacting 1 to 3 moles of phthalic acid anhydride with 2 to 4 moles of ethylene oxide or propylene oxide and 1 mole of acrylic acid or methacrylic acid as an initiator at a temperature of less than 100 °C. in the presence of lithium acrylate or lithium methacrylate, and then separating out any unreacted excess ethylene oxide or propylene oxide.

The copolymer of the component (A) of the present invention, when n in themonomer (I) is 1 and the copolymerizable $\alpha,\beta$-monoethylenically unsaturated compound is shown by M, has the following formula

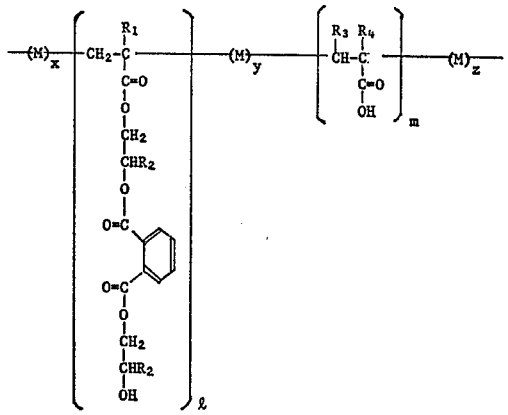

wherein $x$, $y$ and $z$ are 0 or a positive integer and $l$ and $m$ are 1 or a positive integer more than 1. If the copolymerizable $\alpha,\beta$-monoethylenically unsaturated compound is butyl acrylate, M shows the following unit.

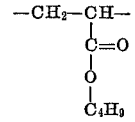

Thermosetting coatings compositions composed of a copolymer of an $\alpha,\beta$-monoethylenically unsaturated compound and an alkylated aminoplast have been already disclosed in U.S. Pat. No. 3,082,184 (1963) and the typical one is a mixture of a copolymer of $\beta$-hydroxypropyl methacrylate or $\beta$-hydroxyethyl methacrylate and an alkylated aminoplast. However, these compositions are generally poor in leveling property and particularly the sanding marks on the primer coating surface appear on the coating surface distinctly and the appearance of the coated articles is considerably deteriorated.

The thermosetting coating compositions of this invention are excellent in the leveling property and therefore the above described sand marks formed on the primer coating surface do not substantially appear and a very beautiful and smooth coating surface can be formed, which is the first merit of this invention.

In previous thermosetting coating compositions, a means for improving the gloss, hardness and mar resistance of the coating film by copolymerizing styrene containing an aromatic ring has been known but the copolymer of styrene is poor in the yellowing resistance and outdoor durability.

The thermosetting coating compositions of the present invention have excellent gloss, hardness and mar resistance and further improved yellowing resistance and outdoor durability, which is the second merit of this invention.

The third merit of this invention is to enable to introduce a necessary amount of carboxylic group corresponding to use of the thermosetting coating composition by the monomer (II) of one component of the copolymer of the component (A). Namely, it is possible to obtain liquid thermosetting coating compositions dissolved in an organic solvent and liquid thermosetting coating compositions dissolved or dispersed in water homogeneously by adjusting the amount of carboxylic group. The carboxylic group is essential as an internal curing agent in the former liquid compositions and in the latter liquid compositions is essential as an internal dispersing agent or an internal solubilizing agent in the form of amine salts.

The fourth merit of this invention consists in the fact that considerably pale colored organic solvent soluble thermosetting coating compositions can be obtained. The monomer (I) does not contain any tertiary amine which is often used in the ring breakage reaction and consequently the copolymer of the monomer (I) is generally pale-colored at the most and very transparent, so that pigmented coating compositions having clear color can be obtained.

The copolymers of the component (A) of this invention are partly similar in the configuration to the branched polyesters disclosed in U.S. Pat. No. 3,375,271, which are obtained by a ring breakage reaction of a dicarboxylic acid anhydride and a monoepoxide in the presence of a tertiary amine by using a copolymer (referred to as "acid copolymer" hereinafter) of an α,β-monoethylenically unsaturated carboxylic acid and the other α,β-monoethylenically unsaturated compound copolymerizable therewith as an initiator.

The above branched polyesters are different from the copolymers of the component (A) according to this invention in view of the fact that a major part of the remaining carboxylic groups form a dicarboxylic acid anhydride half ester structure which is readily hydrolyzed or that such branched polyesters are the copolymers of a monomer mixture corresponding to the monomer (I), wherein n is less than 1. Namely, if the acid copolymer is a copolymer of acrylic acid and butyl acrylate, the copolymer is shown by the following formula

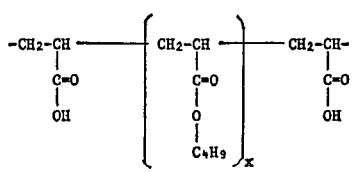

wherein x is a positive integer more than 1. Even if the above copolymer is reacted with 1 mole of ethylene oxide with respect to 2 moles of carboxylic groups in the presence of a tertiary amine and then reacted with 1 mole of phthalic acid anhydride and 1 mole of ethylene oxide in order to remain a stable carboxyl group contained in the acid copolymer, it is impossible to expect the production of the product having the following configuration (X).

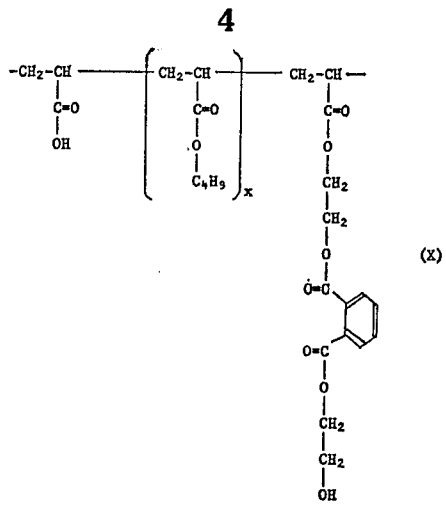

Because, the ethylene oxide to react with phthalic acid anhydride half ester is reacted with the remaining carboxyl group in the acid copolymer to form the product having the phthalic acid anhydride half ester and β-hydroxyethyl ester the configuration of which is as follows.

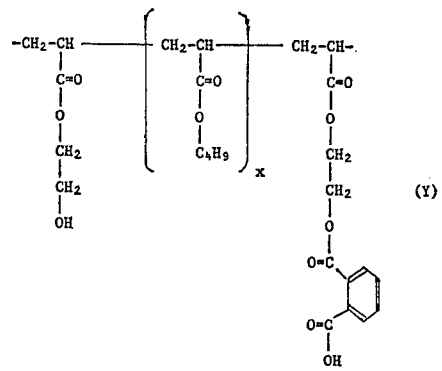

When the product (Y) is reacted with further ethylene oxide, the product (Z) is produced.

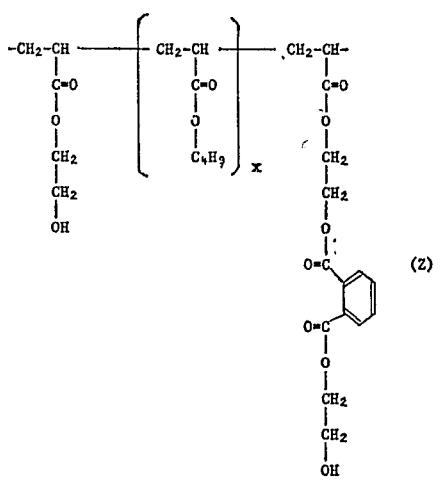

The product (Z) corresponds to the case when n in the monomer (I) is less than 1 and a carboxyl group stable against hydrolysis can not easily be introduced. Furthermore, even if such substance is used instead of the copolymer of the component (A), the thermosetting coating compositions having the above described merits cannot be obtained.

Furthermore, the reaction using the acid copolymer as an initiator is generally high in viscosity at the reaction temperature and therefore needs a large amount of solvent. Accordingly, it is difficult to complete the reaction and the purification is difficult because of the high molecular weight of the product. For such reasons, it is impossible to obtain the branched polyesters containing a sufficiently small amount of unreacted material. Even if possible, the purification is of high cost and is not practical. When any dicarboxylic acid anhydride remains as an unreacted material, it deteriorates the gloss and water resistance of the coating film and in an extreme case, it separates and precipitates from the coating compositions. When the monoepoxide remains, it reacts gradually at room temperature with carboxyl group necessary for curing, thereby the curing property lowers and in practice it becomes necessary to add an acidic substance. As such acidic substances, phosphoric acid, p-toluenesulfonic acid and derivatives thereof have been known but such low molecular weight acidic substances decrease the chemical resistance, water resistance and corrosion resistance of the coating film and therefore these substances are not used except for particular objects.

On the contrary, the thermosetting coating compositions of this invention have a very small amount of unreacted material which is negligible. This is based on the following reasons. The initiator to be used for production of the monomer (I) is liquid and the resulting monomer has enough fluidity to stir at the reaction temperature and it is not necessary to add a large amount of organic solvent during the process for producing the monomer (I). In the same sense it is impossible in this invention to increase $n$ in the formula of the monomer (I) without limitation. When $n$ is more than 3, the viscosity increases too high at the end stage of the reaction and the necessary amount of solvent increases and therefore the completion of the reaction becomes difficult and the amount of unreacted material which remains increases. Accordingly, $n$ must be 1 to 3 and is preferred to be 1 or 2. In production of the monomer (I), it is often necessary to add an excess amount of alkylene oxide in order to increase the reaction velocity or to decrease the amount of phthalic acid anhydride which remained. In this case, the alkylene oxide must be ethylene oxide or propylene oxide having a high volatility. The excess amount of ethylene oxide or propylene oxide can be easily and completely removed by distillation under a reduced pressure.

Furthermore, the monomer (I) can be purified by diluting the monomer with a water-insoluble organic solvent, such as toluene or xylene and washing with water and in this case, also, as the number of $n$ increases, the separation of water becomes difficult and the range of $n$, within which the purification can be effected, is 1 to 3, preferably 1 to 2.

The monomer (II) of one component of the copolymer of the component (A) includes acrylic acid, methacrylic acid, itaconic acid and crotonic acid. Among them, acrylic acid and methacrylic acid are particularly preferable, because they can be mixed with the other monomers in an optional ratio.

The $\alpha,\beta$-monoethylenically unsaturated compounds copolymerizable with the monomers (I) and (II) include acrylic acid esters, such as, methyl acrylate, ethyl acrylate, butyl acrylate, cyclohexyl acrylate, octyl acrylate, 2-ethylhexyl acrylate, lauryl acrylate; methacryic acid esters, such as, methyl methacrylate, ethyl methacrylate, butyl methacrylate, cyclohexyl methacrylate, octyl methacrylate, 2-ethylhexyl methacrylate, and lauryl methacrylate and further acrylonitrile, vinyl acetate, vinylpyrrolidone dimethyl itaconate, diethyl itaconate, dibutyl itaconate and the like. Furthermore, a small amount of styrene, vinyltoluene acrylamide, diacetoneacrylamide and the like may be used.

The copolymer of the component (A) is produced by a radical polymerization of 15 to 99% by weight of the monomer (I), 1 to 20% by weight of the monomer (II) and 0 to 84% by weight of $\alpha,\beta$-monoethylenically unsaturated compound copolymerizable with the monomers (I) and (II).

When the amount of the monomer (I) is less than 15% by weight, the leveling property characteristic of the thermosetting coating compositions of the present invention is not sufficient and the particularly preferable range is 20 to 80% by weight.

The amount of the monomer (II) is determined according to the use of the thermosetting coating compositions. When the monomer (II) is used for the liquid thermosetting coating compositions dissolved in an organic solvent, said amount is preferred to be 1 to 5% by weight and when the monomer (II) is used for the thermosetting coating compositions dispersed in water, said amount is preferred to be 3 to 15% by weight and when the monomer (II) is used for the thermosetting coating compositions dissolved in water, said amount is preferred to be 4 to 20% by weight. The monomer (II) may be used in a larger amount, but as the amount increases, the water resistance and the moisture resistance of the coating film become poor.

The copolymer of the component (A) is produced by adding and dissolving 0.1 to 5% by weight of a radical type catalyst, for example, azobisisobutyronitrile, benzoyl peroxide, t-butyl perbenzoate, t-butyl hydroperoxide or cumene hydroperoxide into the mixture of the above described monomers, adding a proper organic solvent thereto so as to form the monomer concentration of 30 to 80% by weight and refluxing the solution for 2 to 6 hours under atmospheric pressure, or by previously refluxing a proper organic solvent under atmospheric pressure and then adding a mixture of the above described monomers and the radical type catalyst gradually in 1 to 4 hours. The temperature of the polymerization reaction varies depending upon the boiling point of the organic solvent, but it is desirable that the temperature does not exceed 160° C. in order to suppress the dehydration reaction of the hydroxyl group contained in the monomer (I) and the carboxyl group contained in the monomer (II). The resulting solution of the copolymer of the component (A) can be used directly or after adjusting to proper concentration and viscosity by concentration or dilution.

The preferable organic solvent to be used for production of the copolymer of the component (A) includes aromatic hydrocarbons, such as toluene, xylene; ester solvents, such as ethyl acetate, butyl acetate, cellosolve acetate; ketone solvents, such as methyl ethyl ketone, methyl isobutyl ketone, dibutyl ketone, isophorone; alcohol solvents, such as ethyl alcohol, isopropyl alcohol, butyl alcohol, methyl Cellosolve, Cellosolve, butyl Cellosolve, cyclohexyl alcohol, etc. and mixtures thereof. Particularly, the alcohol solvents, a part of the ketone solvents and a part of the ester solvents are advantageous, because the solution of copolymer of the component (A) obtained in the polymerization reaction can be used for the water reducible coating compositions directly.

For production of the thermosetting coating compositions dissolved in on organic solvent, the solution of the copolymer of the component (A) is mixed with an alkylated aminoplast of the component (B), which is generally used in the coating field as a curing agent. The alkylated aminoplast is a condensate of a compound containing one or more triazine rings in the molecule, a formaldehyde and a saturated monohydric alcohol having 1 to 6 carbon atoms. Particularly, the aminoplasts alkylated with saturated monohydric alcohols having 3 to 6 carbon atoms are preferable. The alkylated aminoplasts are, for example, butylated melamine resin, isobutylated melamine resin, butylated phenyl acetoguanamine resin, butylated benzoguanamine resin, butylated phthaloguanamine resin, butylated $\gamma$-methyl-$\gamma$-acetylpimeloguanamine resin and the like. The particular alkylated aminoplast is selected according to the object of use of the thermosetting coating compositions. For example, alkylated melamine resin, alkylated phenylacetoguanamine resin and alkylated $\gamma$-methyl-$\gamma$-acetyl-pimeloguanamine resin are selected for outdoor durability and alkylated benzoguanamine resin, alkylated phenylacetoguanamine resin and alkylated phthaloguanamine resin are selected for gloss. For general purposes alkylated melamine resin is most desirable in view of the cost. These alkylated aminoplasts are commercially available as solutions in an alcohol solvent or a mixed solvent of an alcohol and a hydrocarbon, which may be used directly.

The mixture ratio of the component (A) and the component (B) is optional, but for the usual coatings, the ratio of the component (A) to the component (B) is preferred to be 60/40–90/10 (weight ratio), more preferably,65/35–85/15 (weight ratio). When the component (B) is less than 10% by weight, the coating film is insufficient in hardness and solvent resistance, while if the component (B) is more than 40% by weight, the coating film is lower in water resistance.

For production of water reducible thermosetting coating compositions dispersed or dissolved in water homogeneously, 0.6 to 1 mole based on 1 mole of carboxyl group contained in the copolymer, of an amine is added to the copolymer of the component (A).

The amine to be used includes ammonia, triethylamine, triisopropylamine, tributylamine, dimethylethanolamine, diethylethanolamine, diethanolamine, triethanolamine, triisopropanolamine, monomethyldiethanolamine, monoethyldiethanolamine, monomethyldiisopropanolamine, monoethyldiisopropanolamine, morpholine, N-methylmorpholine, N-hydroxyethylmorpholine, N-hydroxypropylmorpholine, etc.

The resulting amine salts are mixed with a water dispersible or soluble alkylated aminoplast of the component (B). The alkylated aminoplast to be used in water reducible thermosetting coating compositions includes methylated melamine resin, ethylated melamine resin, n-propyl melamine resin, isopropyl melamine resin, etc. In general, the alkylated aminoplasts having a high degree of alkylation have a high storage stability and are preferable. Particularly preferable is the condensate of hexakis (methoxymethyl) melamine or hexakis (ethoxymethyl) melamine and ethylene glycol or propylene glycol. Cymel 300 (made by American Cyanamid Co. trademark) and Nikalac MW–30 (made by Japan Carbide Industries Co., trademark) and the like are commercially available. These products are methylated melamine resins. The mixture ratio of the component (A) and to the component (B) is 60/40–90/10 (weight ratio), preferably 70/30 to 90/10 (weight ratio). The mixture of the component (A) and the component (B) is diluted to proper concentration and viscosity by means of distilled water and then used.

The liquid thermosetting coating compositions dissolved in an organic solvent can be coated on domestic electric apparatuses, automobiles, light metallic building materials and baked at a temperature of 120 to 150° C. for 15 to 30 minutes to form a cured film.

Furthermore, the water reducible thermosetting coating compositions of this invention can be coated on domestic electric apparatuses, parts of automobiles, parts of machines and aluminum building materials by dipping, spraying, electrodeposition and baked at a temperature of 140 to 180° C. for 20 to 30 minutes to form a cured film.

The thermosetting coating compositions of this invention can provide pigmented thermosetting coating compositions by adding pigments, dyestuffs, aluminum flake pigment as generally used in the painting field.

The thermosetting coating compositions dissolved in an organic solvent of this invention can be used for one coat finish of metals after increasing the property of adhering to metals by adding a condensate of diphenol propane and epichlorohydrin. The condensate of diphenolpropane and epichlorohydrin to be used is shown by the following general formula

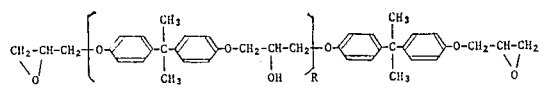

The condensate of diphenolpropane and epichlorohydrin is often characterized by the molecular weight. A particularly preferable range of molecular weight is 300 to 2,000 and those available commercially are Epikote 815, Epikote 828, Epikote 834, Epikote 1001 and Epikote 1004 (Epikote is made by Shell Chemical Co., trademark).

The amount of the above described condensate to be added to the thermosetting coating compositions for increasing the property of adhering to metals is sufficient in less than 30% by weight and the particularly preferable amount is 10 to 20% by weight.

The thermosetting coating composition of this invention may be mixed with a cellulose ester in order to promote the air drying of the coating film and to decrease the interval between repeating coatings. The cellulose ester to be used for the purpose includes cellulose nitrate, celluolse propionate, cellulose butyrate, cellulose acetate butyrate, cellulose acetate propionate, but cellulose acetate butyrate is particularly desirable in view of excellent compatibility and broad use. For example, EAB–551, EAB–531 and EAB–381 are commercially available (EAB is produced by Eastman Chemical Products Inc., trademark).

When cellulose acetate butyrate is mixed for the above described purpose, the amount is sufficient in less than 30% by weight and the particularly preferable amount is 5 to 25% by weight.

The following examples are given in illustration of this invention and are not intended as limitations thereof.

The "part" and "percent" in the examples mean by weight.

EXAMPLE 1

Into a four-necked flask of 2 l. capacity equipped with a reflux condenser were charged 172 g. of methacrylic acid, 296 g. of phthalic anhydride, 35.2 g. of lithium methacrylate and 0.2 g. of hydroquinone monomethyl ether and the resulting mixture was heated at 80° C. while stirring. Then, 278.4 g. of propylene oxide was added dropwise through a dropping funnel. After the addition, the reaction mixture was stirred continuously at 80–90° C. and aged until an acid value became less than 5. After the completion of the reaction, unreacted propylene oxide was distilled off and the precipitated cake was filtered off to obtain 650 g. of a product, which corresponds to the monomer (I) having the general formula, wherein $R_1$ and $R_2$ are $CH_3$ and $n$ is 1.

This product had an average molecular weight of about 340 measured by a vapor pressure osmometer, a bromine value (Br. absorbing amount/g. sample) of 46 and a hydroxyl value of 165.

244 parts of xylene was refluxed in a flask equipped with an agitator, a reflux condenser and a thermometer and then a mixture of 210 parts of the monomer (I), 12 parts of acrylic acid as the monomer (II), 300 parts of butyl methacrylate, 78 parts of butyl acrylate and 6 parts of t-butyl perbenzoate was added thereto over a period of about 1.5 hours, and thereafter the reflux was continued for about 2.5 hours. Then the resulting mixture was diluted with 150 parts of xylene to obtain a thermoplastic copolymer (component (A)) solution having a solid content of 60%. This solution had a viscosity of 0 (Gardner-Holdt viscosity, at 25° C.), an acid value of 11.6 and a Garden color number of 1..

Said copolymer solution was mixed with a 60% butyl alcohol solution of butylated melamine resin (Component (B)) having 6 cc./g. of mineral spirits tolerance (hereinafter abridged as MST) so that the mixture ratio of Component (A) Component (B) is 70/30, and then the resulting mixture was diluted with xylene to form a liquid thermosetting coating composition having a solid content of 50%.

To the thus obtained liquid thermosetting coating composition was added xylene, so that the viscosity is 20 seconds (Ford. Cup. No. 4 viscosity, at 20° C.) and the resulting composition was sprayed on a steel panel coated with an epoxyester primer, and then baked at 140° C. for 20 minutes. The cured coating film had a thickness of about 50μ and showed the following excellent properties.

Transparency—excellent
Gloss—excellent
Pencil hardness—H
Erichsen fall point—6 mm.
Water resistance (4 weeks, at 20° C.)—good
Alkali resistance (5% aqueous solution of NaOH, at 20° C. for 1 week)—good
Acid resistance (5% aqueous solution of HCl, at 20° C. for 1 day)—good

EXAMPLE 2

144 g. of acrylic acid, 296 g. of phthalic anhydride, 26.3 g. of lithium acrylate, 80 mg. of tert-butyl catechol and 278 g. of propylene oxide were reacted in the same manner as described in Example 1 to obtain 630 g. of a product, which corresponds to the monomer (I) having the general formula, wherein $R_1$ is H, $R_2$ is $CH_3$ and $n$ is 1.

This product had an average molecular weight of 330, a bromine value of 48 and a hydroxyl value of 171.

283 parts of xylene was refluxed in the same flask as used in Example 1, and then a mixture of 500 parts of the monomer (I) 10 parts of acrylic acid as the monomer (II), 200 parts of ethyl acrylate and 7 parts of t-butyl perbenzoate was added thereto over a period of 2.5 hours, and thereafter the reflux was continued for 2.5 hours. The thus obtained thermoplastic copolymer Component (A) solution had a solid content of 70%, a viscosity of U–V, an acid value of 7.4 and a Gardner color number of 1-2.

To 390 parts of said solution were added 187 parts of a 50% isobutyl alcohol solution of isobutylated melamine resin (Component (B)) having a 4 cc./g. of MST and further xylene in such an amount that a liquid thermosetting coating composition had a solid content of 50% to form a liquid thermosetting coating composition.

Then, 225 parts of rutile titanium white was dispersed in said composition by means of a roll mill to form a white coating composition, which was diluted with a mixed solvent xylene/Cellosolve acetate (8/2 by weight) until the viscosity is 20 seconds (Ford. Cup. No. 4 viscosity, at 20° C.), and then the resulting coating composition was sprayed on a steel panel coated with an electrocoating primer and baked at 140° C. for 20 minutes.

The curved coating film had a thickness of about 55μ. The surface of the film was very smooth and the whiteness was excellent. The film showed the following excellent properties.

Gloss (Gardner, 60° gloss meter)—94
Pencil hardness—2H-3H
Erichsen fall point—4.5 mm.
Water resistance (4 weeks, at 20° C.)—good
Alkali resistance (5% aqueous solution of NaOH, at 20° C. for 1 week)—good
Acid resistance (5% aqueous solution of HCl, at 20° C. for 1 day)—good In order to obtain an equal gloss with a conventional paint of this type, it is necessary to use a vinyl copolymer copolymerized with at least 30% of styrene, but the coating composition of this example was superior in yellowing resistance to said conventional paint.

EXAMPLE 3

5 parts of carbon black was dispersed in a mixed solution of 60 parts of the copolymer solution as described in Example 1, 30 parts of butylated phenylacetoguanamine resin (50% butyl alcohol solution) and 5 parts of xylol by means of a roll mill to prepare a block coating composition. Then said black coating composition was diluted with a mixed solvent of xylene/Cellosolve acetate (8/2 by weight), sprayed on a steel panel coated with an epoxy ester primer in a conventional spraying method and baked at 140° C. for 20 minutes. The cured coating film hoving excellent gloss, hardness and sharpness of image was obtained.

EXAMPLE 4

A mixed pigment of 15 parts of rutile titanium white, 5 parts of chrome yellow and 4 parts of prussion blue was dispersed in a mixed solution of 36 parts of the copolymer solution as described in Example 2, 18 parts of butylated melamine resin (60% butyl alcohol solution) having 8 cc./g. of MST and 22 parts of xylene by means of a roll mill to prepare a pigmented coating composition, which was diluted with a mixed solvent of Solvesso 100 (an aromatic hydrocarbon solvent sold by Esso Standard Oil Company, trademark)/butylcarbitol (8/2 by weight) and the diluted composition was sprayed on a galvanized steel panel coated with an electrocoating primer in a conventional spraying method and baked at 250° C. for 1 minute. The thus obtained coating film was good in gloss and balance between hardness and flexibility.

EXAMPLE 5

86 g. of methacrylic acid, 296 g. of phthalic anhydride and 145 g. of ethylene oxide were reacted in the same manner as described in Example 1 by using 0.1 g. of hydroquinone as a polymerization inhibitor and 10.5 g. of lithium methacrylate as a catalyst to obtain 495 g. of a product, which corresponds to the monomer (I) having the general formula, wherein $R_1$ is $CH_3$, $R_2$ is H and $n$ is 2. This product had an average molecular weight of about 500, a bromine value of 32 and a hydroxyl value of 110.

200 parts of xylene and 50 parts of butyl alcohol were charged in the same flask as used in Example 1 and refluxed and thereto were added 125 parts of the monomer (I) (2), 20 parts of methacrylic acid as the monomer (II), 150 parts of methyl methacrylate, 100 parts of ethyl acrylate and 5 parts of t-butyl perbenzoate over a period of 1.5 hours, and thereafter the reflux was continued for 2.5 hours. Then, to the reaction mixture was added 250 parts of xylene to obtain a copolymer (component (A)) solution having a solid content of 50%. The copolymer solution had a viscosity of U–V, an acid value of 13.7 and a Gardner color number of 1.

|  | Percent by weight |
| --- | --- |
| Rutile titanium white | 30.0 |
| 50% copolymer solution | 42.0 |
| 60% solution of butylated melamine resin (MST:8 cc./g.) | 10.0 |
| 60% solution of Epikote 1001 | 5.0 |
| Xylene | 12.9 |
| 1% DC 200 [a] silicon additive | 0.1 |
| Total | 100.0 |

[a] Silicon additive sold by Dow Corning Company, trademark.

A white coating composition prepared according to the above described recipe was sprayed on a smooth steel panel and baked at 150° C. for 20 minutes to obtain a cured coating film. This coating film was excellent in adhering property, gloss, hardness, flexibility, corrosion resistance, alkali resistance, detergent resistance and water resistance.

EXAMPLE 6

172 g. of methacrylic acid, 296 g. of phthalic anhydride and 202 g. of ethylene oxide were reacted in the same manner as described in Example 1 by using 0.2 g. of hydroquinone and 26.4 g. of lithium methacrylate to obtain 620 g. of a product, which corresponds to the monomer (I) having the general formula, wherein $R_1$ is $CH_3$, $R_2$ is H and $n$ is 1. This product had an average molecular weight of about 320, a bromine value of 49.2 and a hydroxyl value of 170.

200 parts of xylene and 50 parts of butyl alcohol were charged in the same flask as used in Example 1 and refluxed and thereto was added a mixture of 420 parts of the monomer (I), 12 parts of methacrylic acid as the monomer (II), 168 parts of butyl acrylate and 6 parts of t-butyl perbenzoate over a period of 2.5 hours, and thereafter the reflux was continued for 3 hours. After cooled, 144 parts of Cellosolve acetate was added to the reaction mixture to obtain a thermoplastic copolymer (component (A)) solution having a solid content of 60%, a viscosity of R–S, an acid value of 8.1 and a Gardner color number of 1–2.

| | Percent by weight |
|---|---|
| Aluminum tinting paste No. 1595 a | 2.0 |
| 60% copolymer solution | 40.0 |
| 50% solution of phenylacetoguanamine (Example 4) | 24.0 |
| 25% solution of EAB-551-0.2 | 16.0 |
| Xylene | 17.9 |
| 1% DC 200 silicon additive | 0.1 |
| Total | 100.0 | a Aluminum paste sold by Aluminum Company of America, trademark.

A metallic coating composition prepared according to the above described recipe was sprayed on a steel panel coated with an epoxy ester primer and baked at 150° C. for 20 minutes. The resulting cured coating film was excellent in smoothness and gloss and showed an excellent outdoor durability when effecting an outdoor exposure test for 2 years. Furthermore, this coating film was superior in acid resistance (5% aqueous solution of $H_2SO_4$, at 20° C. for 24 hours) to the cured coating film of Example 3.

EXAMPLE 7

200 parts of xylene and 50 parts of Cellosolve were charged in the same flask as used in Example 1 and refluxed and thereto was added a mixture of 175 parts of the same monomer (I) as used in Example 6, 10 parts of acrylic acid as the monomer (II), 135 parts of methyl methacrylate, 175 parts of butyl acrylate, 5 parts of acrylamide and 10 parts of t-butyl hydroperoxide over a period of 2.5 hours, and further the reflux was continued for 3 hours. After cooled, the reaction mixture was diluted with 240 parts of xylene to obtain a thermoplastic copolymer (component (A)) solution having a solid content of 50%, a viscosity of U–V, an acid value of 8.4 and a Gardner color number of 1. 70 parts of said copolymer solution was mixed with 25 parts of a 60% butyl alcohol solution of butylated melamine resin (component (B)) having 8 cc./g. of MST and 2 parts of xylene, and then 3 parts of aluminum paste was dispersed in the resulting mixture by agitation to form a metallic coating composition.

The metallic coating composition was sprayed on a steel panel coated with an epoxy ester primer in a conventional spraying method and baked at 140° C. for 20 minutes. The cured coating film had a thickness of about 40μ and showed good flexibility and extremely excellent gasoline resistance.

EXAMPLE 8

200 parts of xylene and 93 parts of Cellosolve acetate were charged in the same flask as used in Example 1 and refluxed and thereto was added a mixture of 490 parts of the same monomer (I) as used in Example 6, 14 parts of methacrylic acid as the monomer (II), 196 parts of 2-ethylhexyl acrylate and 7 parts of t-butyl perbenzoate over a period of 2.5 hours, and thereafter the reflux was continued for 3 hours. The thus obtained thermoplastic copolymer (component (A)) solution had a solid content of 70%, a viscosity of X–Y, an acid value of 9.4 and a Gardner color number of 1–2.

This copolymer solution was mixed with a 50% butyl alcohol solution of butylated benzoguanamine resin (component (B)) having 1.8 cc./g. of MST in a mixture ratio of Component-A/Component-B being 75/25 (solid content ratio) to obtain a liquid thermosetting coating composition dissolved in an organic solvent.

Rutile titanium white was dispersed in said composition in such an amount that the pigment binder ratio was 1 by means of a roll mill to obtain a white coating composition having a solid content of 57%, which was able to spray. The cured coating film obtained by baking the composition on an aluminum plate at 140° C. for 20 minutes showed gloss of more than 98 and was excellent in the water resistance, alkali resistance, acid resistance, hardness and flexibility. However, the outdoor durability was poor and a choking occurred in an outdoor exposure test for 1 year.

EXAMPLE 9

The procedure of Example 8 was rpeated by using a 50% butyl alcohol solution of butylated phthaloguanamine resin having 6 cc./g. of MST as the component (B). In this case, the resulting cured coating film was substantially equal in gloss, hardness, water resistance, alkali resistance and acid resistance to that of Example 8, but the flexibility and outdoor durability were improved.

Furthermore, when a 50% butyl alcohol solution of butylated γ-methyl-γ-acetyl-pimeloguanamine resin having 4 cc./g. of MST was used as the component (B), the resulting cured coating film showed a further improvement in the flexibility and outdoor.

EXAMPLE 10

250 cc. of toluene was charged in a pressure-proof flask of 2,000 ml. equipped with a reflux condenser, a thermometer and an agitator and was refluxed and thereto was added a monomer mixture composed of 375 g. of the same monomer (I) as used in Example 2 48 g. of acrylic acid as the monomer (II), 327 g. of cyclohexyl methacrylate and 15 g. of benzoyl peroxide over a period of 2.5 hours, and thereafter the reflux was continued for 1 hour. Then, toluene was distilled off at 100–110° C. under a reduced pressure and a uniform and transparent copolymer (component (A)) having an acid value of 52 was obtained. To 400 g. of this copolymer were added 53 g. of triethanolamine, 100 g. of hexakis (methoxymethyl) melamine and 100 g. of methyl isobutyl ketone and the resulting mixture was heated to 50–60° C. to form a uniform and transparent resin composition. Then this composition was diluted with distilled water to a concentration of 15%, while agitating, to form a uniform dispersion. This dispersion was introduced in a bath for electrocoating and then an electrodeposition was effected by passing an electric current of 40 volts through said bath with an aluminum plate serving as an anode for 2 minutes. The film electrodeposited on aluminum plate was washed with water and subjected to a heat treatment at 180° C. for 30 minutes to obtain a hard, glossy and transparent coating film insoluble in acetone.

EXAMPLE 11

200 g. of isobutyl alcohol was charged in the same flask as used in Example 10 and refluxed and thereto was added a monomer mixture composed of 450 g. of the same monomer (I) as used in Example 1, 40 g. of acrylic acid as the monomer (II), 260 g. of 2-ethylhexyl acrylate and 15 g. of benzoyl peroxide over a period of 2 hours, and thereafter the reflux was continued for 3 hours to form a uniform and transparent copolymer (component (A)) solution having a solid content of 78% and an acid value of 32.

500 g. of said copolymer solution was kneaded with 250 g. of rutile titanium white by means of a roll mill and the concentration of the resulting mixture was adjusted with isobutanol and then 25 g. of morpholine and 100 g. of hexakis (methoxymethyl) melamine (component (B)) were added and further the distilled water was added to form a water reducible white coating composition having a solid content of 15%.

A steel panel was coated with said composition at 80 volts and for 2 minutes in the same manner as described in Example 10, air-dried for 15 minutes and baked at 170° C. for 30 minutes to form a coated steel panel. The thus obtained coating film had a gloss of 92 and a pencil hardness of 2H and no crack occurred at 90° bending test. The surface of the coating film was smooth and the whiteness was excellent.

EXAMPLE 12

In this example a particular alkylated aminoplast of the component (B) was used. In the case of water reducible thermosetting coating composition, hexakis (methoxymethyl) melamine and hexakis (ethoxymethyl) melamine to be used as the component (B) is high in the degree of alkylation and low in the degree of condensation, so that it is necessary to bake at a relatively elevated temperature. The methylol group is poor in stability in an aqueous solution, so that it is not desirable to make the degree of alkylation low. However, as illustrated in this example, it is possible to produce a water reducible thermosetting coating composition capable of being cured at a lower temperature by increasing the degree of condensation (The process and the effect are described in detail in Journal of Applied Polymer Science, 12, 213 (1968)).

Namely, to 2 moles of hexakis (methoxymethyl) melamine and 0.4 mole of ethylene glycol was added 2% by weight of formic acid and the resulting mixture was heated at 120–130° C. for 3 hours while agitating, whereafter the temperature was raised to 160–170° C., and methanol was distilled off from the system. When the amount of methanol distilled off became small, the pressure was gradually reduced and the reaction was continued at 60 mm. Hg until methanol was not distilled off.

When the thus obtained polycondensate of hexakis (methoxymethyl) melamine was used instead of the component (B) of Example 11 and the baking was effected at 150° C. for 30 minutes, the resulting cured coating film was substantially equal in hardness to that of Example 11 and a gloss was improved to 94.

EXAMPLE 13

144 g. of acrylic acid, 296 g. of phthalic anhydride and 96.8 g. of ethylene oxide were reacted in the same manner as described in Example 1 by using 0.2 g. of tert-butyl catechol and 21.2 g. of lithium acrylate to obtain 518 g. of a product, which corresponds to the monomer (I) having the general formula, wherein $R_1$ and $R_2$ are H and $n$ is 1. This product had an average molecular weight of about 310, a bromine value of 51 and a hydroxyl value of 180.

200 g. of isopropanol was charged in the same flask as used in Example 10 and refluxed and thereto was added a monomer mixture composed of 560 g. of the monomer (I), 62 g. of acrylic acid as the monomer (II), 178 g. of ethyl acrylate and 12 g. of benzoyl peroxide over a period of 1 hour, and further the reflux was continued to obtain a copolymer (component (A)) solution having a solid content of 80% and an acid value of 50. 500 g. of this copolymer solution was kneaded with 200 g. of rutile titanium white and the concentration of the resulting mixture was adjusted with isopropanol, and then 100 g. of hexakis (methoxymethyl) melamine and 44 g. of triethylamine were added, and thereafter the resulting mixture was diluted with a mixed solvent of Cellosolve/distilled water=30/70 to a concentration of 40%. This diluted composition was sprayed on a bonderited steel panel having a thickness of 0.8 mm., air-dried and baked at 170° C. for 30 minutes to form a cured coating film. The coating film had a gloss of 90 and a pencil hardness of 4H.

EXAMPLE 14

200 g. of isopropanol was charged in the same flask as used in Example 10 and refluxed and thereto was added a mixture of 95 g. of the same monomer (I) as used in Example 13, 77 g. of acrylic acid as the monomer (II), 428 g. of ethyl acrylate and 6 g. of t-butyl perbenzoate over a period of 2.5 hours and then the reflux was continued for 5 hours. Thereafter 194 g. of isopropanol was added thereto to obtain a copolymer (component (A)) solution having a solid content of 60% and an acid value of 62.

To 500 g. of this copolymer solution were added 36 g. of 25% ammonia water and 35 g. of hexakis (methoxymethyl) melamine, and the resulting mixture was diluted with distilled water to a solid content of 50%, which was kneaded with 20 g. of strontium chromate pigment by means of a sand mill and further diluted by distilled water to a concentration of 15%. The resulting composition was introduced in a bath for electrocoating and then an electrodeposition was effected at a bath temperature of 40° C. by passing an electric current of 30 volts through said bath with a galvanized steel panel (thickness: 0.3 mm.) serving as an anode for 5 seconds. The film electrodeposited on the galvanized steel panel was washed with water and baked at 180° C. for 2 minutes. The thickness of the film was 5μ.

Furthermore, a vinyl coating composition based on vinyl chloride copolymer resin, Vinylite VMCH (made by Union Carbide Co.) was coated on said film by means of a roll coater and baked at 180° C. for 2 minutes. The total thickness of the film was 25μ. When a salt spray test was effected on the galvanized steel panel for 1,000 hours, the corrosion resistance was extremely excellent and also the adhering property, the moisture resistance and the water resistance were excellent.

What is claimed is:

1. An organic solvent soluble thermosetting coating composition, which comprises a thermoplastic copolymer (component (A)) consisting of 15–99% by weight of a monomer (I) having the formula:

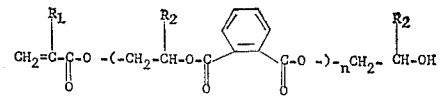

wherein $R_1$ is hydrogen or methyl group, $R_2$ is hydrogen, methyl group or a combination of hydrogen and methyl group and $n$ is 1 to 3, said monomer (I) being produced by reacting 1 to 3 moles of phthalic acid anhydride with 2 to 4 moles of ethylene oxide or propylene oxide and 1 mole of acrylic acid or methacrylic acid as an initiator at a temperature of less than 100° C. in the presence of lithium acrylate or lithium methacrylate, and then separating out any unreacted excess ethylene oxide or propylene oxide, 1–5% by weight of an α,β-monoethylenically unsaturated carboxylic acid (monomer (II)) selected from the group consisting of acrylic acid and methacrylic acid and 0 to 84% by weight of an α,β-monoethylenically unsaturated compound (monomer (III)) copolymerizable with the monomers (I) and (II) and an alkylated aminoplast (component (B)) selected from the group consisting of alkylated melamine resin, alkylated phthaloguanamine resin, alkylated phenylacetoguanamine resin and alkylated γ-methyl-γ-acetylpimeloguanamine resin, the ratio of the component (A) to the component (B) being from 60/40 to 90/10.

2. The organic solvent soluble thermosetting coating composition as claimed in claim 1, wherein said alkylated melamine resin is selected from the group consisting of butylated melamine resin and isobutylated melamine resin.

3. The organic solvent soluble thermosetting coating composition as claimed in claim 1, wherein said alkylated benzoguanamine resin is selected from the group consisting of butylated benzoguanamine resin and isobutylated benzoguanamine resin.

References Cited

UNITED STATES PATENTS

| 3,367,992 | 2/1968 | Bearden | 260—78.5 |
| 3,376,271 | 4/1968 | Masters et al. | 260—78.5 |

JOHN C. BLEUTGE, Primary Examiner

U.S. Cl. X.R.

117—75, 132 BF, 138.8 G, 161 LN, 161 UC; 204—181; 260—15, 17 R, 29.4 U, 31.2 N, 31.4 R, 32.8 N, 33.2 R, 33.4 R, 33.6 UA, 39 P, 39 M, 78.5 B, 78.5 E, 834, 836